Figure 1:
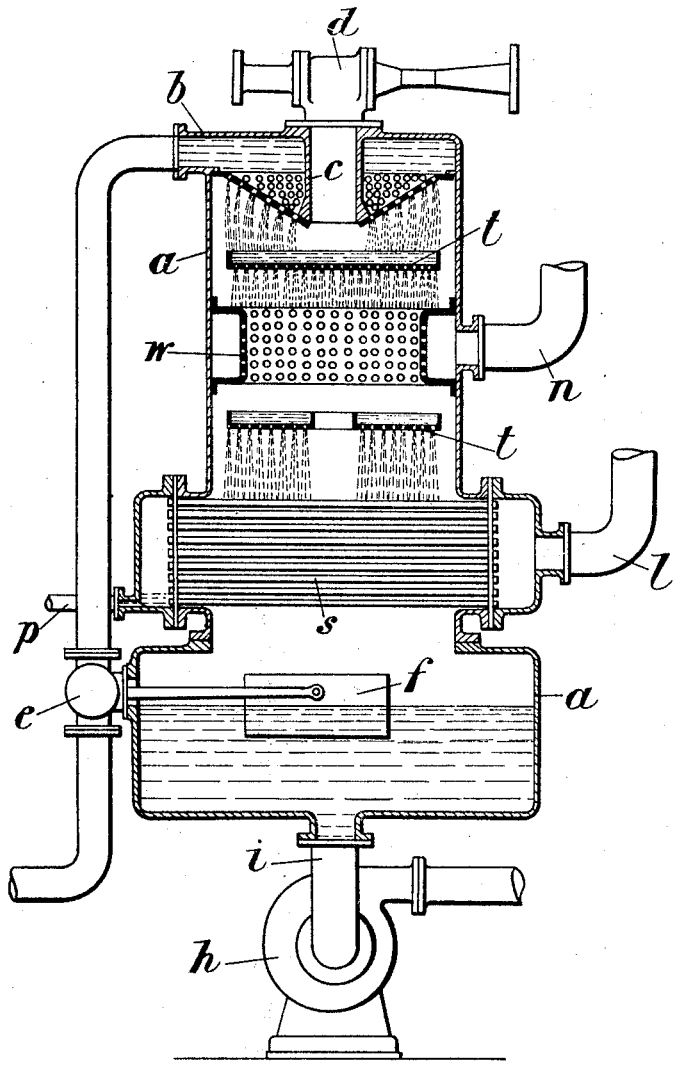

Patented Nov. 24, 1925.

1,562,827

UNITED STATES PATENT OFFICE.

HARRY FOTHERGILL, OF WESTMINSTER, LONDON, ENGLAND.

APPARATUS FOR THE REMOVAL OF GASES FROM LIQUIDS.

Application filed October 11, 1924. Serial No. 743,067.

*To all whom it may concern:*

Be it known that I, HARRY FOTHERGILL, of Westminster, in the county of London, England, a subject of the King of Great Britain, have invented certain new and useful Improvements in Apparatus for the Removal of Gases from Liquids, of which the following is a specification.

This invention has reference to improvements in or relating to apparatus for the removal of gases from liquids, and is particularly applicable to apparatus of the kind described in the specification of my prior Patent No. 1,416,632.

For the purpose of simplifying the description of the present invention the liquid from which it is desired to remove gases will be referred to as water, and the gases referred to as air, while the heating medium will be referred to as steam, but it is to be clearly understood that the invention is applicable for the removal of gases from any liquids by the use of any heating medium.

Water sprayed amongst steam will become heated and give up a certain proportion of the contained air, but for effective deaeration this process alone is insufficient. Water can be very efficiently deaerated by creating violent ebullition, and in the apparatus described in the patent above referred to this effect is obtained by a flashing process whereby the water is shattered into minute particles which allow for the complete liberation of the contained gases.

In the apparatus referred to, the flashing of the liquid is obtained by allowing it to fall on a hot surface, the steam resulting from this flashing being used in the upper part of the apparatus for heating the incoming water so that preliminary deaeration of the water takes place before it comes in contact with the hot surface. This hot surface usually consists of a bank of steam heated tubes which act like a low pressure flash boiler, so that when the falling heated water comes in contact with the tubes, the water is repeatedly flashed as it falls from one tube to another, and the contained gases are completely liberated.

It will thus be seen that with apparatus of the kind described the removal of gases takes place, as it were, in two stages. There is a preliminary liberation of a part of the contained gas during the time the liquid is being heated before it comes in contact with the hot surface. In addition there is a further removal of the remaining gases when the heated water flashes on the hot surfaces.

Now I have found from experiment that in certain cases, provided the liquid is heated to boiling point before it comes in contact with the hot surface, that the area of the hot surface can be greatly reduced, because its object under these conditions is not to raise the temperature of the falling water but only to transfer to the water such a quantity of latent heat as will cause the liquid to burst or flash and give up this heat in the form of steam, and in accordance with the present invention the heating surface is restricted to the amount which is considered necessary for the flashing of the heated liquid, such liquid having been previously raised in temperature by direct contact with steam or other heating medium supplied from an external source in addition to the steam rising from the hot surface within the apparatus.

The supplementary steam used for heating the liquid by direct contact may be led from an external source direct into the chamber in which the water is heated, the steam being admitted either above or below the hot surface or into a body of water in the lower portion of the chamber. Or such steam may first pass through the heating surface and then be admitted into the chamber for direct contact heating, preferably through a loaded valve or other suitable device by which the pressure of steam in the heating surface and therefore the temperature can be maintained at a higher pressure and temperature than that in the heating chamber.

Figure 2:
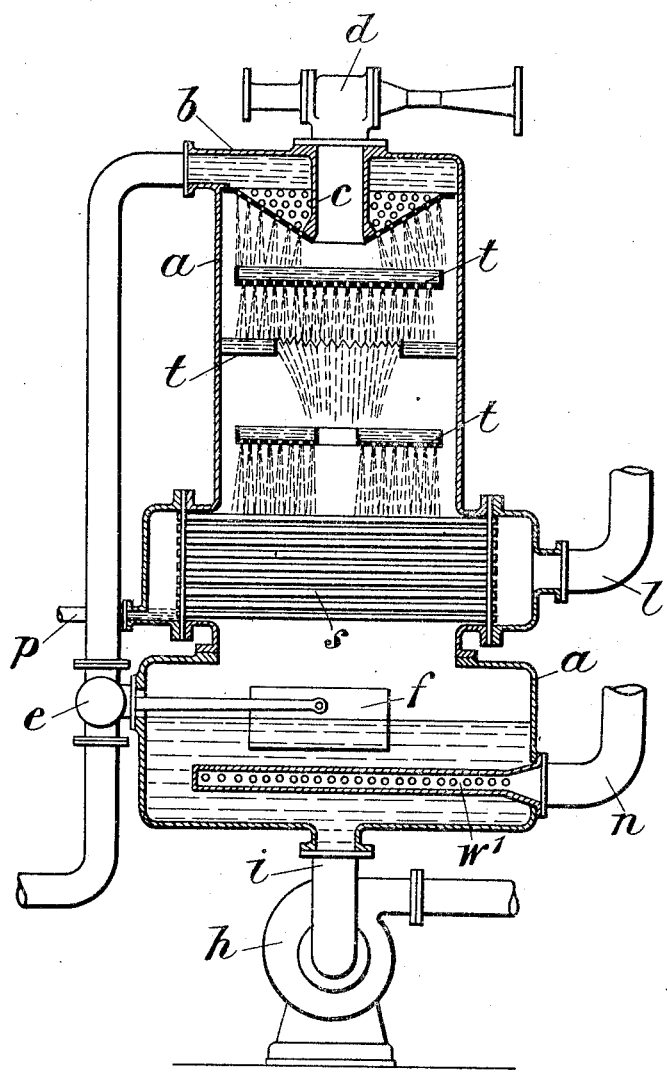
Figure 3:
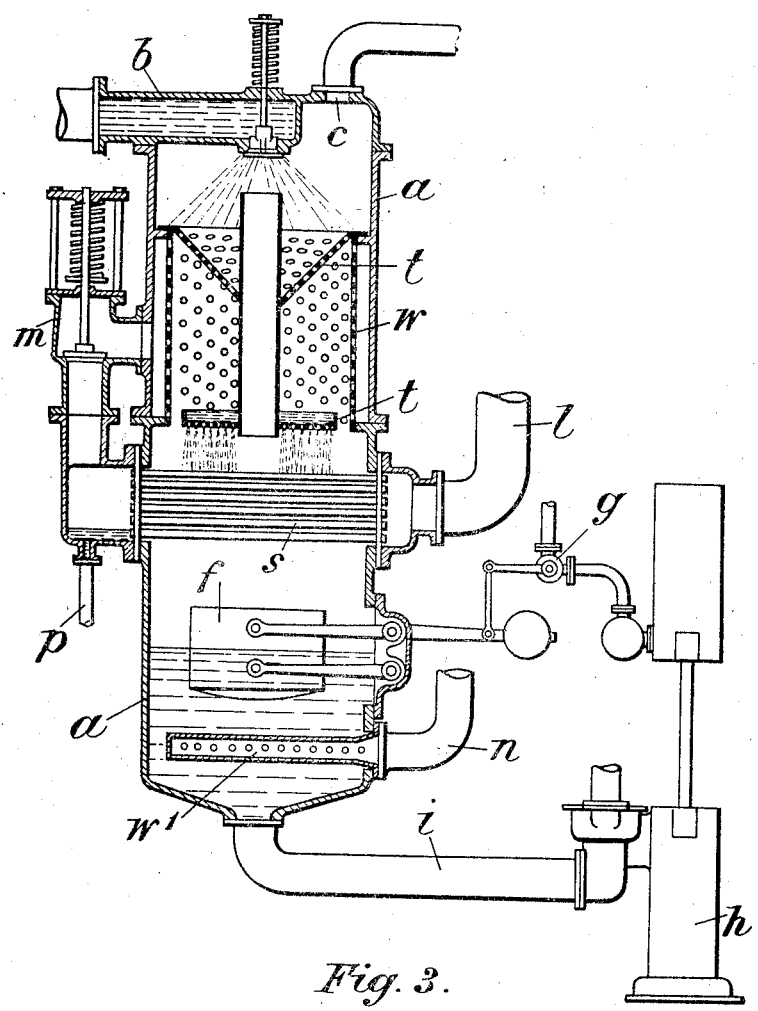

Figs. 1, 2 and 3 illustrate convenient forms of my invention particularly suitable for removing the air from boiler feed water, the same letters of reference being used to denote similar parts. The deaerating chamber *a* has an inlet *b* for the water to be treated and an outlet for the deaerated water at *i* which may be conveniently connected to the pump *h*. In Figs. 1 and 2 the water supply to the inlet *b* is under control of the valve *e* operated by the float *f*. The water on entering the chamber *a* is distributed by the trays *t* and after becoming heated is sprayed over the hot tube surface *s* by which violent ebullition or flashing is produced in the manner hereinbefore described. The liberated gases are removed through the outlet $c$ which may be connected in any convenient manner. For example, when the deaerator is working under vacuum, it may be connected to a steam condenser or to an air extracting device $d$ as shown in Figs. 1 and 2. The heating surface $s$ supplied with steam through the pipe $l$ is, in accordance with the present invention, restricted to the amount of surface which is considered necessary for the flashing or ebullating of the heated liquid, such liquid having been previously raised in temperature by direct contact with steam in the upper part of the chamber $a$.

In Fig. 1 a supplementary supply of steam is admitted through the pipe $n$ into the steam space of the chamber $a$ and is distributed by means of the internal perforated annular wall $w$.

In Fig. 2 the supplementary steam supply is admitted into the body of the water by means of a perforated pipe $w^1$, the steam rising from the water passing over the tube surface $s$ into the upper part of the chamber $a$ in which it heats the water falling from the trays $t$ whereby preliminary deaeration of water is effected.

In Fig. 3 supplementary steam first passes through the heating surface $s$ and then through a loaded valve $m$ into the chamber $a$ wherein it is distributed through the perforated wall $w$, the valve $m$ being loaded to such a pressure as will maintain the desired temperature in the tubes $s$, and further steam is supplied through the pipe $n$ to the perforated pipe $w^1$ which is immersed in the body of liquid in the chamber $a$. The float $f$ in this example controls the supply of steam to the pump $h$. This arrangement has the particular advantage that when exhaust steam from engines is used, the oil in such steam is very efficiently separated from the steam as it passes through the tubes $s$ forming the heating surface, because during the process of condensation the oil coalesces with the particles of water and passes away into the drainage system through the pipe $p$.

Although particular arrangements are shown in the drawings by way of example, the interior of the chamber $a$ in which the water is heated may be constructed in any convenient form and the supplementary steam supply may be admitted into such chamber direct or through a loaded valve so as to maintain any predetermined desired pressure in the steam supply thereto.

The arrangements described have the great advantage that the heating surface and therefore the cost of the apparatus can be greatly reduced in connection with plants for which this method of working is desirable.

For example if, for any reason, a certain predetermined outlet temperature is required, the surface necessary for effecting the flashing or ebullition at the desired temperature may be considerably less than that required to give the desired outlet temperature, and according to my invention, instead of providing the extra surface, with its attendant increase in the size and cost of the installation, I propose to employ only that surface which will satisfactorily effect the flashing or ebullition of the liquid, and raise the outlet temperature to that required by introducing steam from an outside source into direct contact with the liquid in the deaeration vessel.

What I claim and desire to secure by Letters Patent is:—

1. Apparatus for the removal of gases from liquids comprising a vessel, means for introducing liquid into the vessel in a falling spray, an exposed heating surface within said vessel sufficient to effect ebullition of the liquid at the temperature and pressure existing in the vessel, said surface being arranged beneath the falling spray and upon which surface the liquid is sprayed and is ebullated, and a connection to the vessel for the introduction of a heating medium from an outside source in to direct contact with the liquid falling through the vessel.

2. Apparatus for the removal of gases from liquids, comprising a vessel, means for introducing liquid into said vessel, in a falling spray, an exposed steam heated surface within said vessel, said surface being arranged beneath the falling spray and sufficient to effect ebullition of the liquid at the temperature and pressure existing in the vessel upon which surface said liquid is sprayed and is ebullated, and a connection to the vessel for the introduction of steam from an outside source into direct contact with the liquid falling through the vessel.

3. Apparatus for the removal of gases from liquids, comprising a vessel, means for introducing liquid into said vessel in a falling spray, heating tubes exposed within said vessel, said surface being arranged beneath the falling spray and sufficient to effect ebullition of the liquid at the temperature existing in the vessel upon which tubes the liquid is sprayed and is ebullated, a connection for conveying a heating medium to and through said tubes, and a connection to the vessel for the introduction of a heating medium from an outside source into direct contact with the liquid falling through the vessel.

4. Apparatus for the removal of gases from liquids, comprising a vessel, means for introducing liquid into said vessel in a falling spray, heating tubes exposed within said vessel sufficient to effect ebullition of the liquid at the temperature existing in the vessel upon which tubes the liquid falls and is ebullated, a connection for conveying a heating medium to and through said tubes and thence into direct contact with the liquid falling through said vessel.

5. Apparatus for the removal of gases from liquids comprising a vessel, heating tubes within said vessel sufficient to effect ebullition of the liquid at the temperature existing in the vessel, a connection for conveying a heating medium to and through said tubes and thence into direct contact with the liquid within said vessel and a further connection to the vessel for the introduction of steam from an outside source into direct contact with the liquid within the vessel.

6. Apparatus for the removal of gases from liquids comprising a vessel, heating tubes within said vessel sufficient to effect ebullition of the liquid at the temperature existing in the vessel, and a connection for conveying a heating medium to and through said tubes and thence through a loaded valve into direct contact with the liquid within said vessel.

7. Apparatus for the removal of gases from liquids comprising a vessel, heating tubes within said vessel sufficient to effect ebullition of the liquid at the temperature existing in the vessel, a connection for conveying a heating medium to and through said tubes and thence through a loaded valve into direct contact with the liquid within said vessel and a further connection to the vessel for the introduction of a heating medium from an outside source into direct contact with the liquid within the vessel.

8. Apparatus for the removal of gases from liquids, comprising a vessel, means for introducing liquid into said vessel in a falling spray, an unsubmerged steam heated surface exposed within said vessel sufficient to effect ebullition of the liquid at the temperature and pressure existing in the vessel upon which surface the liquid falls and is ebullated, and a connection to a submerged perforated pipe within the vessel for the introduction of steam from an outside source into direct contact with the collected liquid within the vessel.

9. Apparatus for the removal of gases from liquids, comprising a vessel, means for introducing liquid into said vessel in a falling spray, a steam heated surface within said vessel sufficient to effect ebullition of the liquid at the temperature and pressure existing in the vessel upon which surface the liquid falls and is ebullated, a perforated pipe submerged in liquid in the vessel, and a connection to said perforated pipe for the introduction of steam into direct contact with the body of liquid in the vessel.

10. Apparatus for the removal of gases from liquids comprising a vessel, a heating surface within said vessel sufficient to effect ebullition of the liquid at the temperature existing in the vessel, means for causing the liquid to fall in a finely divided condition on to said surface and a connection to the vessel for the introduction of a heating medium from an outside source into direct contact with the liquid within the vessel.

11. Apparatus for the removal of gases from liquids comprising a vessel, a steam heated surface within said vessel sufficient to effect ebullition of the liquid at the temperature existing in the vessel, means for causing the liquid to fall in a finely divided condition on to said surface and a connection to the vessel for the introduction of steam from an outside source into direct contact with the liquid within the vessel.

12. Apparatus for the removal of gases from liquids comprising a vessel, a steam heated surface within said vessel sufficient to effect ebullition of the liquid at the temperature existing in the vessel, means for causing the liquid to fall in a finely divided condition on to said surface and a connection to the vessel for the introduction of steam from an outside source into direct contact with the falling liquid within the vessel.

13. Apparatus for the removal of gases from liquids, comprising a vessel, means for introducing liquid into said vessel in a falling spray, a steam heated surface within said vessel sufficient to effect ebullition of the liquid at the temperature existing in the vessel, a perforated pipe submerged in liquid in the vessel, and a connection to said perforated pipe for the introduction of steam into direct contact with the body of liquid in the vessel, and a connection to the vessel for the introduction of steam from an outside source into direct contact with the falling liquid within the vessel.

14. Apparatus for the removal of gases from liquids comprising a vessel, heating tubes within said vessel sufficient to effect ebullition of the liquid at the temperature existing in the vessel, means for causing the liquid to fall in finely divided condition on to said heating tubes, a connection for conveying a heating medium to and through said tubes and a connection to the vessel for the introduction of a heating medium from an outside source into direct contact with the falling liquid within the vessel.

15. Apparatus for the removal of gases from liquids comprising a vessel, heating tubes within said vessel sufficient to effect ebullition of the liquid at the temperature existing in the vessel, means for causing the liquid to fall in finely divided condition on to said tubes, a connection for conveying steam to and through said tubes and then into direct contact with the falling liquid within said vessel and a further connection to the vessel for the introduction of steam from an outside source into direct contact with the body of liquid within the vessel.

16. Apparatus for the removal of gases from liquids comprising a vessel, a steam heated surface within said vessel sufficient to effect ebullition of the liquid at the temperature existing in the vessel, means for spraying the liquid on to said heated surface, a connection for introducing steam into direct contact with the falling liquid in said vessel and a connection to a submerged perforated pipe within the vessel for the introduction of steam from an outside source into direct contact with the body of liquid within the vessel.

17. Apparatus for the removal of gases from liquids comprising a vessel, heating tubes within said vessel sufficient to effect ebullition of the liquid at the temperature existing in the vessel, means for causing the liquid to fall in finely divided condition on to said tubes, a connection for conveying steam to and through said tubes and thence through a loaded valve into direct contact with the falling liquid within said vessel and a further connection to the vessel for the introduction of steam from an outside source into direct contact with the body of liquid within the vessel.

In testimony whereof, I affix my signature.

HARRY FOTHERGILL.